United States Patent
Liu et al.

(10) Patent No.: US 7,966,271 B2
(45) Date of Patent: Jun. 21, 2011

(54) DEVICE INFLUENCED TABLE FORMATTING

(75) Inventors: William Weili Liu, Shenzhen (CN); Shengcan Xu, Shenzhen (CN); Frank Zen Fan, Shenzhen (CN)

(73) Assignee: Microsoft Corporation, Redmond, WA (US)

( * ) Notice: Subject to any disclaimer, the term of this patent is extended or adjusted under 35 U.S.C. 154(b) by 652 days.

(21) Appl. No.: 12/119,479

(22) Filed: May 12, 2008

(65) Prior Publication Data

US 2009/0281976 A1    Nov. 12, 2009

(51) Int. Cl.
    *G06F 15/18* (2006.01)
(52) U.S. Cl. .................................. 706/12; 706/47
(58) Field of Classification Search .................... 706/12
    See application file for complete search history.

(56) References Cited

U.S. PATENT DOCUMENTS

| | | | |
|---|---|---|---|
| 6,088,708 A | 7/2000 | Burch et al. | |
| 6,675,351 B1 | 1/2004 | Leduc | |
| 6,865,720 B1 | 3/2005 | Otani et al. | |
| 7,065,707 B2 | 6/2006 | Chen et al. | |
| 7,139,721 B2 * | 11/2006 | Borders et al. | 705/7.24 |
| 7,177,825 B1 * | 2/2007 | Borders et al. | 705/26.81 |
| 7,243,179 B2 * | 7/2007 | Apostol et al. | 710/244 |
| 7,278,098 B1 | 10/2007 | Boye et al. | |
| 7,290,048 B1 * | 10/2007 | Barnett et al. | 709/223 |
| 7,734,775 B2 * | 6/2010 | Barnett et al. | 709/224 |
| 7,747,572 B2 * | 6/2010 | Scott et al. | 707/636 |
| 2006/0195782 A1 | 8/2006 | Wang et al. | |

OTHER PUBLICATIONS

Thatcher, "What Accessibility Testing is Possible", Web Accessibility: Web Standards And Regulatory Compliance, 2006, pp. 11.
"Creating Accessible Tables", 1999-2008, WebAIM, pp. 10.
"H39: Using Caption Elements to Associate Data Table Captions with Data Table", Techniques for WCAG 2.0, W3C, 2007, pp. 3.
"Data and Layout Tables", 2003, The Board of Regents of the University of Wisconsin System, pp. 7.
Hudson, "Accessible Data Tables", Web Essential Info Night in Sydney, Jun. 30, 2005, pp. 20.

* cited by examiner

*Primary Examiner* — Michael Holmes
(74) *Attorney, Agent, or Firm* — Alleman Hall McCoy Russell & Tuttle LLP

(57) ABSTRACT

A server includes a logic subsystem and memory. The memory holds instructions that, when executed by the logic subsystem, cause the logic subsystem to determine if a table is wider than a viewing size of a screen of a requesting device, determine if the table is a data table or a layout table, and format an instance of the table prior to sending that instance of the table to the requesting device. The instance of the table sent to the requesting device is formatted in accordance with a determined viewing size of the screen of the requesting device and in accordance with a determined table type.

20 Claims, 2 Drawing Sheets

DEVICE INFLUENCED TABLE FORMATTING

BACKGROUND

The Internet and the World Wide Web can be used to share information with a variety of users located around the world. Such information can be accessed with a variety of different types of devices, such as desktop computers, laptop computers, tablet computers, personal data assistants, mobile phones, and others. The display capabilities of such devices can be substantially different from one another. Such differences can make it difficult to format information so as to facilitate easy reading and/or viewing on the different types of devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The present disclosure teaches a process for formatting tables in accordance with how the table is being used and in accordance with the relative width of the table compared to the space available for displaying the table. Such table formatting is performed prior to sending a formatted instance of the table to a requesting device.

DETAILED DESCRIPTION

Figure 1:
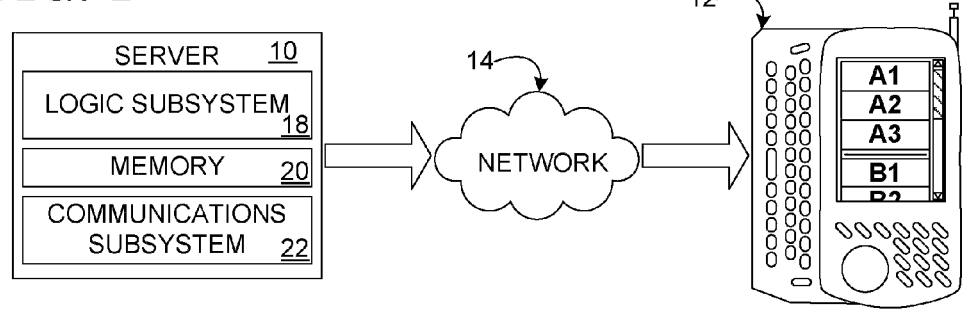
FIG. 1 shows a server sending a formatted instance of a table to a requesting device in accordance with an embodiment of the present disclosure.

FIG. 1 schematically shows a server 10 that is configured to serve content to one or more devices. As discussed in more detail below, the server may serve content that includes a table and/or content that does not include a table. As a nonlimiting example, a table may include an html table identified by the <table> and </table> tags. It should be understood that other markup languages, schemas, and/or data structures may define tables differently, and that such differently defined tables may be processed in accordance with the present disclosure.

A table can be used to organize information into rows and columns. Such a format may be useful for presenting a schedule, a calendar, stock quotes, or a wide range of other organized information. When used for this purpose, a table can be referred to as a data table.

A table can also be used to control the relative positioning of one or more elements with respect to each other. For example, different text, graphics, and/or other elements can be placed in a cell of the table. Such a cell can hold an element in the same relative position to other cells of the table, which also may be used to hold one or more elements. Such a table may be useful in creating a desired aesthetic. When used for this purpose, a table can be referred to as a layout table.

In the illustrated embodiment, server 10 is serving content to a requesting device 12 in the form of a mobile telephone. Server 10 can additionally or alternatively serve content to a personal computer, a personal data assistant, another server, or any other device configured to receive content from the server.

In the illustrated embodiment, server 10 is serving content via a network 14. In some embodiments, the server may be configured to serve content via the Internet. In some embodiments, the server may serve content via another network, such as an intranet or a cellular network.

As shown in FIG. 1, server 10 may include a logic subsystem 18, memory 20, and a communications subsystem 22.

Logic subsystem 18 may be configured to execute one or more instructions. For example, the logic subsystem may be configured to execute one or more instructions that are part of one or more programs, routines, objects, components, data structures, or other logical constructs. Such instructions may be implemented to perform a task, implement an abstract data type, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Memory 20 may be configured to hold instructions that, when executed by the logic subsystem, cause the logic subsystem to implement the herein described methods and processes. Memory 20 may include volatile portions and/or non-volatile portions. In some embodiments, memory 20 may include two or more different devices that may cooperate with one another to hold instructions for execution by the logic subsystem. In some embodiments, logic subsystem 18 and memory 20 may be integrated into one or more common devices.

Communications subsystem 22 may be configured to communicate with one or more devices by sending and receiving data or other information. As a nonlimiting example, communications subsystem 22 may utilize the Internet protocol suite, including the transmission control protocol and the Internet protocol.

Figure 2:
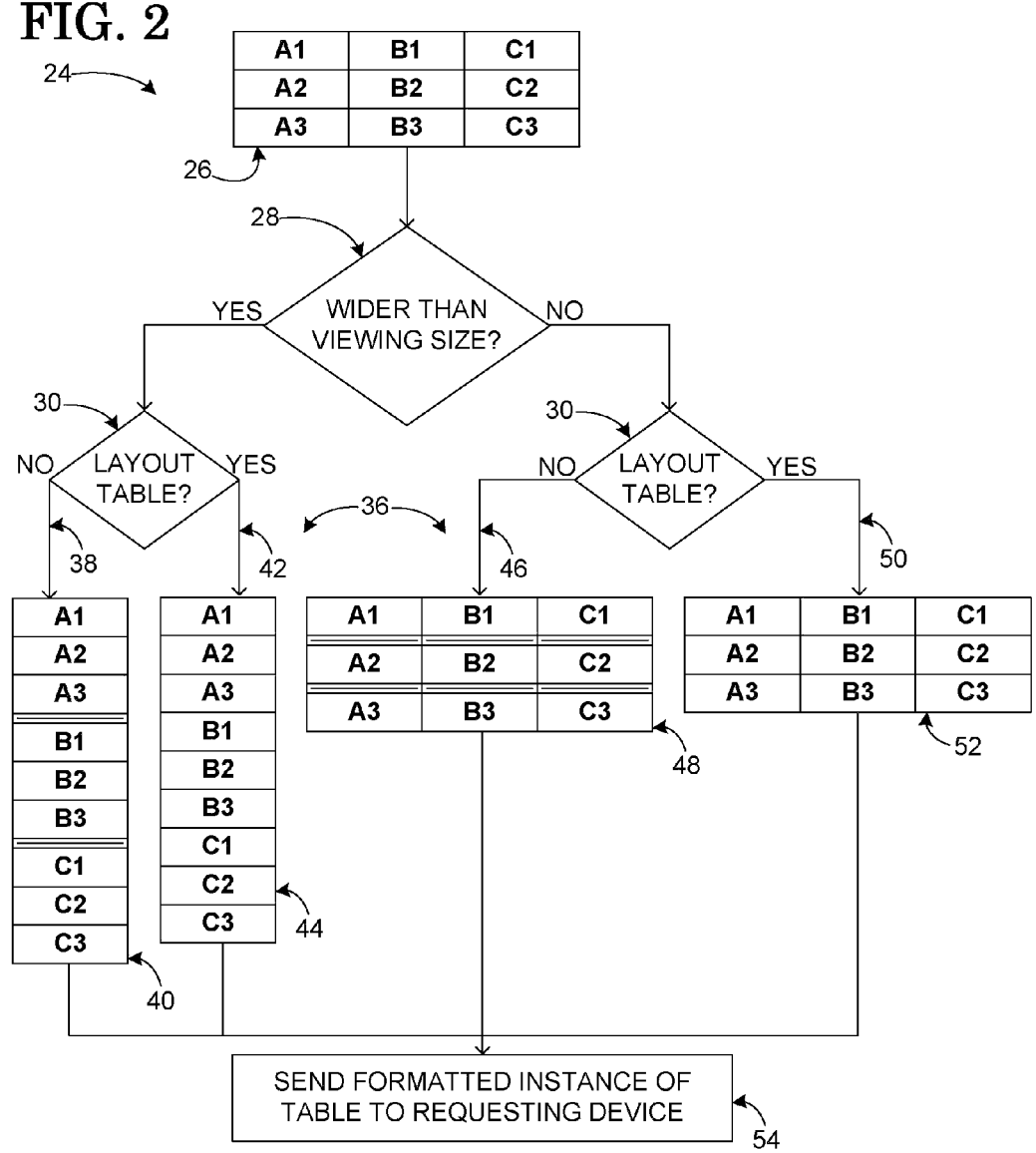
FIG. 2 shows a process flow of a method of delivering a formatted instance of a table to a requesting device in accordance with an embodiment of the present disclosure.

FIG. 2 shows an example process flow of a method 24 of delivering a table to a requesting device. Method 24 may be implemented by server 10. In particular, memory 20 may include instructions for implementing method 24, and when executed by logic subsystem 18, such instructions may cause the logic subsystem to carry out method 24, or other methods of delivering a table to a requesting device.

FIG. 2 shows a nonlimiting example of a table 26. In the illustrated embodiment, table 26 includes three columns, denoted by capital letters A, B, and C, and three rows denoted by numerals 1, 2, and 3. The table may be defined by a variety of different schemas, markup languages, and/or data structures. As a nonlimiting example, the table may be defined by the following hypertext markup language segment:

```
<table >
    <tr>      <td> A1 </td> <td > B1 </td> <td > C1 </td> </tr>
    <tr>      <td> A2 </td> <td > B2 </td> <td > C2 </td> </tr>
    <tr>      <td> A3 </td> <td > B3 </td> <td > C3 </td> </tr>
</table>
```

At 28, method 24 includes determining if a table is wider than a viewing size of a screen of a requesting device. In some embodiments, server 10 may acquire a screen-width of a requesting device as part of making this determination. A screen-width may be acquired by a variety of different mechanisms, such as directly querying the requesting device or using a lookup table to correlate a device signature with a screen-width of the device. As used herein, the viewing size and/or the screen width may be used to refer to the effective viewing area of a screen that is available for displaying a table. The viewing size and/or the screen-width may be smaller than the total size of the display. The server may calculate the table width and compare it to the acquired screen-width in order to determine if the table is wider than the viewing size of the screen requesting device.

At 30, method 24 includes determining if the table is a data table or a layout table. In some embodiments, the table will be considered a data table if it includes header tags. In some embodiments, a table that does not include header tags will be considered a layout table. As one nonlimiting example, a table that does not include a header row will be considered a layout table, while a table that does include a header row is further analyzed to determine if that table is a data table or a layout table. For example, hypertext markup language uses the following tags to define a header row: <hr></hr>. The top row (i.e., A1, B1, C1) of table 26 can be defined as a header row using the following hypertext markup language segment.

```
<table >
    <hr>      <td> A1 </td> <td > B1 </td> <td > C1 </td> </hr>
    <tr>      <td> A2 </td> <td > B2 </td> <td > C2 </td> </tr>
    <tr>      <td> A3 </td> <td > B3 </td> <td > C3 </td> </tr>
</table>
```

In some embodiments, the table will be considered a data table if:

$|C-(H \times R)| <= C \times \Delta$ where C is a total number of table cells, H is a total number of table header columns, R is a total number of table rows, and Δ is a predetermined testing variable. The predetermined testing value, Δ, can be set relatively high to allow a substantial degree of variation from a traditional X column by Y row table format (i.e., X columns, Y rows, X×Y total cells), while considering the table a data table. Values higher than 1 will result in all tables being considered data tables. The predetermined testing value, Δ, can be set relatively low if variations from a traditional X column by Y row table format are desired to be interpreted as an indication that the table is being used as a layout table. A predetermined testing value of 0 will result in only tables where C=H×R are considered a data table. It is thought that a predetermined testing value, Δ, of 0.20 may be appropriate for many applications.

Figure 3:
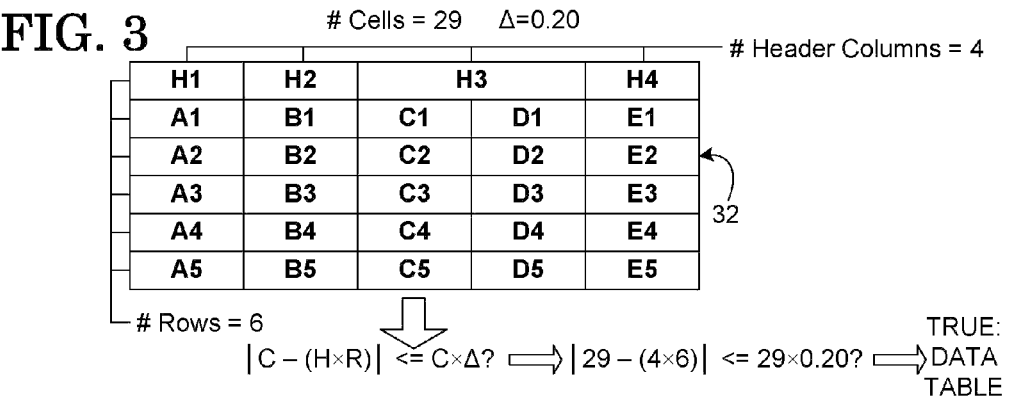
FIG. 3 shows example logic for determining a table is a data table.

FIG. 3 shows a nonlimiting example of a table 32 including six rows (i.e., R=6), four header columns (i.e., H=4), and twenty-nine total cells (i.e., C=29). For purposes of this example, the predetermined testing variable is set to two tenths (i.e., Δ=0.20). As shown $|C-(H \times R)|$ is less than $C \times \Delta$, so the table is considered a data table.

Figure 4:
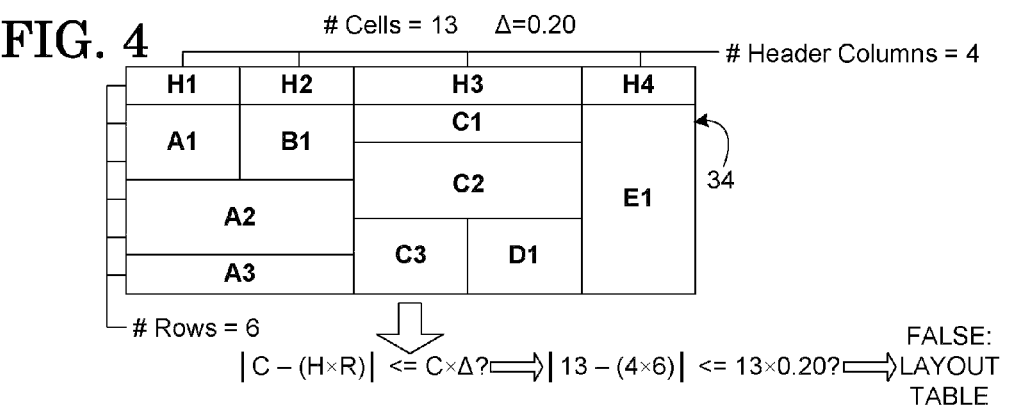
FIG. 4 shows example logic for determining a table is a layout table.

FIG. 4 shows another nonlimiting example of a table 34 including six rows (i.e., R=6), four header columns (i.e., H=4), and thirteen total cells (i.e., C=13). For purposes of this example, the predetermined testing variable is set to two tenths (i.e., Δ=0.20). As shown $|C-(H \times R)|$ is greater than $C \times \Delta$, so the table is considered a layout table.

In some embodiments, tests other than the example tests provided above may be used to determine if a table is a data table or a layout table.

As shown generally at 36, method 24 may include formatting an instance of table 26. The instance of the table can be formatted in accordance with a determined viewing size of the screen of the requesting device and/or in accordance with a determined table type (e.g., data or layout), so that the requesting device may display information from the table in an easily accessible manner. For example, if the table is too wide to fit on the screen of a requesting device, the table can be rearranged into fewer columns so that the table can be viewed with only vertical scrolling as opposed to both vertical and horizontal scrolling.

The instance of the table may be formatted at server 10 prior to sending that instance of the table to a requesting device. Server-side formatting allows virtually all requesting devices to take advantage of the reformatting. In other words, each individual device is not responsible for reformatting the table, because the table is reformatted before being sent to the device.

As shown at 38, if table 26 is a data table that is wider than the viewing size of the screen of the requesting device, an instance 40 of the table can be formatted according to a first rule set. In the illustrated embodiment, the first rule set converts the table into a single-column table and inserts a line between each original table row in the formatted instance of the table (e.g., a line between table cell A3 and table cell B1, and a line between table cell B3 and table cell C1). An inserted line may facilitate easy reading of information in the table. In other embodiments, other adjustments may be made to adapt the table for easy reading and/or viewing. Turning briefly to FIG. 1, requesting device 12 is shown displaying a single-column data table that includes a line between each original table row.

The first rule set may optionally set a width of the single-column table instance to the viewing size of the requesting device, so as to take full advantage of the presentation capabilities of the requesting device. In some embodiments, the first rule set may reduce the total number of columns, but keep the total number of columns greater than one. As a nonlimiting example, if two columns will fit on the requesting device, an instance of a table having two columns may be formed from a table that originally had six columns.

As shown at 42, if table 26 is a layout table that is wider than the viewing size of the screen of the requesting device, an instance 44 of the table can be formatted according to a second rule set. In the illustrated embodiment, the second rule set converts the table into a single-column table. In other embodiments, other adjustments may be made to adapt the table for easy viewing. The second rule set may optionally set a width of the single-column table to the viewing size of the requesting device, so as to take full advantage of the presentation capabilities of the requesting device. In some embodiments, the second rule set may reduce the total number of columns, but keep the total number of columns greater than one.

As shown at 46, if table 26 is a data table that is not wider than the viewing size of the screen of the requesting device, an instance 48 of the table can be formatted according to a third rule set. In the illustrated embodiment, the third rule set inserts a line between each table row. An inserted line may facilitate easy reading of information in the table. In other embodiments, other adjustments may be made to adapt the table for easy reading and/or viewing. The third rule set may optionally set a width of the table to the viewing size of the requesting device, so as to take full advantage of the presentation capabilities of the requesting device.

As shown at 50, if table 26 is a layout table that is not wider than the viewing size of the screen of the requesting device, an instance 52 of the table can be formatted according to a fourth rule set. In the illustrated embodiment, the fourth rule set leaves the table unaltered. The fourth rule set may optionally set a width of the table to the viewing size of the requesting device, so as to take full advantage of the presentation capabilities of the requesting device.

It should be understood that the above rule sets are non-limiting examples of different transformations that can be applied to a table. Other rule sets are within the scope of this disclosure. Furthermore, in some embodiments, two or more of the rule sets may be functionally the same.

As shown at 54, method 24 includes sending a formatted instance of the table to the requesting device. For example, server 10 may send a formatted instance of the table to requesting device 12 via network 14. Furthermore, server 10 may send a differently formatted instance of the table to a different requesting device having different display capabilities. In this way, server 10 can send a version of the table that is well suited for display on the device requesting the table.

Figure 5:
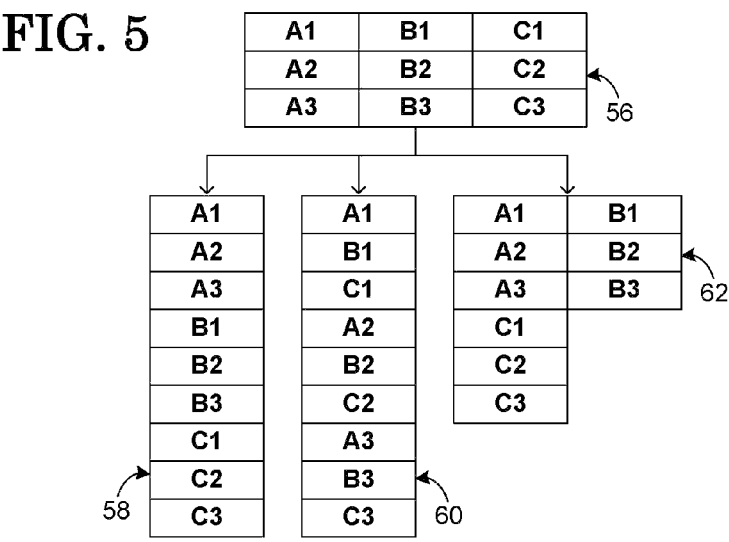
FIG. 5 shows a variety of different ways in which a table having two or more columns can be formatted with fewer columns.

A table having more than one column can be formatted into a table having fewer columns in a variety of different ways while remaining within the scope of this disclosure. For example, FIG. 5 shows three nonlimiting ways in which a table 56 having three columns can be formatted into a table having less than three columns. As shown by table instance 58, each column of table 56 can be kept intact, and each intact column can be sequentially arranged in a single column. As shown by table instance 60, each row of table 56 can be kept intact, and each intact row can be sequentially arranged in a single column. As shown by table instance 62, each column of table 56 can be kept intact, and each intact column can be sequentially arranged in two or more columns. These are only examples, and other transformations are within the scope of this disclosure.

It should be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A server, comprising:
a logic subsystem to execute one or more instructions;
memory holding instructions that, when executed by the logic subsystem, cause the logic subsystem to:
determine if a table is wider than a viewing size of a screen of a requesting device;
determine if the table is a data table or a layout table;
if the table is a data table that is wider than the viewing size of the screen of the requesting device, format an instance of the table according to a first rule set prior to sending that instance of the table to the requesting device;
if the table is a layout table that is wider than the viewing size of the screen of the requesting device, format an instance of the table according to a second rule set prior to sending that instance of the table to the requesting device;
if the table is a data table that is not wider than the viewing size of the screen of the requesting device, format an instance of the table according to a third rule set prior to sending that instance of the table to the requesting device; and
if the table is a layout table that is not wider than the viewing size of the screen of the requesting device, format an instance of the table according to a fourth rule set prior to sending that instance of the table to the requesting device; and
a communications subsystem to send a formatted instance of the table to the requesting device.

2. The server of claim 1, where the instructions cause the logic subsystem to determine if the table is a data table or a layout table at least in part by determining the table is a data table if the table includes a header defined by header tags.

3. The server of claim 1, where the instructions cause the logic subsystem to determine if the table is a data table or a layout table at least in part by determining the table is a data table if $$|C-(H \times R)| <= C \times \Delta$$

where C is a total number of table cells, H is a total number of table header columns, R is a total number of table rows, and $\Delta$ is a predetermined testing variable.

4. The server of claim 1, where the instructions cause the logic subsystem to determine if the table is wider than a viewing size of the screen of the requesting device at least in part by acquiring a screen-width of the requesting device, calculating a table width, and comparing the table width to the screen-width.

5. The server of claim 1, where the first rule set converts the table into a single-column table and inserts a line between each original table row in the formatted instance of the table.

6. The server of claim 5, where the first rule set sets a width of the single-column table to the viewing size of the requesting device.

7. The server of claim 1, where the second rule set converts the table into a single-column table.

8. The server of claim 7, where the second rule set sets a width of the single-column table to the viewing size of the requesting device.

9. The server of claim 1, where the third rule set inserts a line between each table row.

10. The server of claim 1, where the fourth rule set leaves the table unaltered.

11. A method of delivering a table to a requesting device, comprising:
determining if the table is wider than a viewing size of a screen of the requesting device;
determining if the table is a data table or a layout table;
if the table is a data table that is wider than the viewing size of the screen of the requesting device, formatting an instance of the table according to a first rule set prior to sending that instance of the table to the requesting device;

if the table is a layout table that is wider than the viewing size of the screen of the requesting device, formatting an instance of the table according to a second rule set prior to sending that instance of the table to the requesting device;

if the table is a data table that is not wider than the viewing size of the screen of the requesting device, formatting an instance of the table according to a third rule set prior to sending that instance of the table to the requesting device; and if the table is a layout table that is not wider than the viewing size of the screen of the requesting device, formatting an instance of the table according to a fourth rule set prior to sending that instance of the table to the requesting device; and sending a formatted instance of the table to the requesting device.

12. The method of claim 11, where determining if the table is a data table or a layout table includes determining the table is a data table if the table includes a header defined by header tags.

13. The method of claim 11, where determining if the table is a data table or a layout table includes determining the table is a data table if $$|C-(H \times R)| <= C \times \Delta$$

where C is a total number of table cells, H is a total number of table header columns, R is a total number of table rows, and $\Delta$ is a predetermined testing variable.

14. The method of claim 11, where determining if the table is wider than a viewing size of the screen of the requesting device includes acquiring a screen-width of the requesting device, calculating a table width, and comparing the table width to the screen-width.

15. The method of claim 11, where the first rule set converts the table into a single-column table and inserts a line between each original table row in the formatted instance of the table.

16. The method of claim 15, where the first rule set sets a width of the single-column table to the viewing size of the requesting device.

17. The method of claim 11, where the second rule set converts the table into a single-column table.

18. The method of claim 17, where the second rule set sets a width of the single-column table to the viewing size of the requesting device.

19. The method of claim 11, where the third rule set inserts a line between each table row.

20. A server, comprising:
a logic subsystem to execute one or more instructions;
memory holding instructions that, when executed by the logic subsystem, cause the logic subsystem to:
determine if a table is wider than a viewing size of a screen of a requesting device;
determine if the table is a data table or a layout table; and
format an instance of the table prior to sending that instance of the table to the requesting device, that instance of the table being formatted in accordance with a determined viewing size of the screen of the requesting device and in accordance with a determined table type.

* * * * *